United States Patent [19]

Schrattenholz et al.

[11] 4,414,032
[45] Nov. 8, 1983

[54] ANTI-FLOODING AGENT FOR PAINTS AND PLASTERS

[75] Inventors: Walter Schrattenholz, Mainz-Gonsenheim; Eckhard Hilgenfeldt; Volker Knittel, both of Wiesbaden-Schierstein, all of Fed. Rep. of Germany

[73] Assignee: Hoechst Aktiengesellschaft, Fed. Rep. of Germany

[21] Appl. No.: 62,080

[22] Filed: Jul. 30, 1979

Related U.S. Application Data

[63] Continuation of Ser. No. 906,588, May 16, 1978, abandoned.

[51] Int. Cl.$^3$ ............... C08K 5/08; C08K 5/17; C08L 1/26
[52] U.S. Cl. ............... 106/186; 106/308 N; 524/44; 524/245
[58] Field of Search ............... 106/308 N, 186, 288 Q; 524/44, 245

[56] References Cited

U.S. PATENT DOCUMENTS

| | | | |
|---|---|---|---|
| 3,036,118 | 5/1962 | Jackson et al. | 260/584 B |
| 3,036,130 | 5/1962 | Jackson et al. | 260/584 B |
| 3,841,888 | 10/1974 | Belde et al. | 106/288 Q |

FOREIGN PATENT DOCUMENTS

1165544 3/1964 Fed. Rep. of Germany .
2414455 10/1975 Fed. Rep. of Germany .

OTHER PUBLICATIONS

Offenlegungsschrift 2,156,603 May 24, 1973 Belde et al.
Offenlegungsschrift 2,500,865 Jul. 24, 1975 Guzijun et al.
Offenlegungsschrift 2,165,586 Jul. 5, 1973 Kotzschmar et al.

*Primary Examiner*—Allan Lieberman
*Attorney, Agent, or Firm*—James E. Bryan

[57] ABSTRACT

This invention relates to an agent for preventing the flooding of color pigments in aqueous plastic dispersion paints, plastic-based plasters, and distemper paints containing cellulose ethers, which is based on a block polymer in which a di- or polyamine is present as the initial molecule on which alkylene oxide units are added, said block polymer being obtained from one mole of a di- or polyamine of the general Formula I

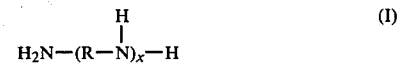

wherein R is an alkylene group with 2 to 6 carbon atoms, and x is a whole number from 1 to 4, by reaction with about 5 to 50 moles of ethylene oxide, followed by reaction with about 5 to 100 moles of propylene oxide.

4 Claims, No Drawings

ANTI-FLOODING AGENT FOR PAINTS AND PLASTERS

This is a continuation of application Ser. No. 906,588, filed May 16, 1978, now abandoned.

The present invention relates to an agent which prevents flooding of color pigments contained in aqueous, cellulose ether-containing plastic dispersion paints, distemper paints, or plastic-based plasters. Further, the invention relates to a paint or plaster containing the agent.

If white plastic dispersion paints, distemper paints or plastic-based plasters which contain cellulose ethers are to be colored, it is often impossible, despite careful stirring, to work the commercially available concentrated pigment pastes used for this purpose into the paints with the desired degree of uniformity. This undesirable effect, which is not recognizable during mixing of the components, normally becomes apparent only when the paints or plasters are spread, rolled on, or otherwise applied to a support, such as a wall or wallpaper, in that the resulting color shade is non-homogeneous. The variations in the color shade are more or less intensive, depending upon the frictional forces occurring during application of the paints or plasters. The treated surfaces display an uneven, blotchy color shade. This normally undesirable effect is designated in the technical terminology as "rub-out" or "flooding" of the pigments.

Numerous additives, mostly surface-active anionic, cationic, or non-ionic substances, have been disclosed and/or are being offered on the market which allegedly prevent such flooding. Nevertheless, the consumer still encounters often insurmountable difficulties because the known substances are, for example, effective in some cases only, or must be added in relatively high quantities so that they adversely affect certain desirable properties of the paint or plaster, or cause a marked reduction of the water-resistance of the dry paint or plaster.

The pigment pastes disclosed in German Auslegeschrift No. 1,165,544, contain substances which are soluble in water, benzene or benzine and which may be obtained by causing propylene oxide to act upon water-soluble aliphatic compounds with less than 8 carbon atoms which contain at least one active hydrogen atom. Suitable aliphatic compounds are monohydric and polyhydric alcohols, partial ethers of polyhydric alcohols, amines and alkylol amines. It is stated in the German Auslegeschrift that the pigment pastes prepared in this manner do not tend to foam and can be very finely distributed by stirring or kneading them in the usual media, of which water and several organic solvents are mentioned.

From German Auslegeschrift No. 2,156,603, or U.S. Pat. No. 3,841,888, aqueous pigment dispersions are known which allegedly do not flocculate in plastic dispersions containing cellulose ethers or distemper paints. Such aqueous pigment dispersions contain from 20 to 25 percent by weight of finely divided pigment, 5 to 25 percent by weight of a surface active agent or a mixture of surface active agents, and 40 to 75 percent by weight of water or a mixture of water and water-retaining substances. The surface active substances are products of a reaction between certain aliphatic diamines or polyamines, or aromatic or cycloaliphatic diamines, with 3 to 50 moles of propylene oxide and a subsequent reaction with 2 to 70 moles of ethylene oxide (the molar quantities refer to the equivalent of reactive amino hydrogen), the proportion of terminal polyethylene oxide blocks ranging from 40 to 80 percent by weight. The coloring of aqueous, binder-containing white pigment paints containing cellulose ethers is stated as the preferred field of application of these pigment dispersions.

Besides the customary additives, the aqueous pigment dispersion disclosed in German Patent No. 2,414,455, contains pigments, condensation products of naphthalene, formaldehyde and sulfuric acid, ethylene oxide adducts to long-chain amines, and polymerization products of ethylene oxide and propylene oxide with terminal polyethylene oxide blocks. In the form of a pigment paste, this aqueous pigment dispersion allegedly shows good flowing behavior, no re-agglomeration of the pigment particles, no formation of lumps, and thus no reduction of the color intensity. A pigment composition prepared in this manner is said to be particularly suitable, for example, for coloring aqueous paints based on plastic dispersions, and especially for coloring wallpaper paints based on plastic dispersions and cellulose derivatives.

German Offenlegungsschrift No. 2,500,865, teaches a process for the preparation of a dry, water-dispersible pigment composition which comprises the following steps: (a) mixing a pigment with water and 15 to 45 percent (based on the weight of the pigment) of a non-ionic dispersing agent, 10 to 70 percent of a water-dispersible, non-ionic polymer, and, if desired, up to 40 percent of a non-ionic colloid, and (b) removing the water from the mixture until a dry mass of a certain composition is obtained. The following compounds are listed as suitable non-ionic dispersing agents: polyether alcohols, alkylene oxide/alkylene diamine block polymers and polyoxy ethyleneglycol or glycerol esters, the block polymers being obtained by addition of propylene oxide to ethylene diamine and subsequent addition of ethylene oxide. The following compounds are listed among the non-ionic polymers: at least partially hydrogenated vinyl acetate polymers or their ether derivatives, N-vinyl pyrrolidone polymers and their copolymers with other vinyl compounds. Cellulose ethers, starches and starch derivatives, natural resins etc. are said to be useful as non-ionic colloids. The pigment mass prepared in this manner allegedly disperses easily in water, is compatible with latex systems and other aqueous systems and shows good resistance to flocculation.

In addition to the above listed auxiliaries, further so-called "anti-flooding agents" as known, for example from E. Karsten: "Lackrohstofftabellen" (Table of Raw Materials for Paints), 6th Edition, Curt R. Vincentz Verlag, Hanover, 1976, some of which are expressly intended for systems which may be diluted with water and for systems to be diluted with solvents and water. Practical experience has shown, however, that heretofore no agents having such an effect could be found, especially those which in the field of cellulose ether-containing plastic dispersions, plastic-based plasters and distemper paints prevent the flooding of the color pigments or pigment pastes added in as many cases as possible. This applies not only to the precautionary treatment of the colored dispersion mixture to be prepared, but especially to a subsequent treatment of such readily prepared colored dispersion mixtures which during practical use, for example during their application to a wall or wallpaper, exhibit flooding of the color pigments.

It is thus the object of the present invention to provide an anti-flooding agent for pigments which is superior to the agents known from the prior art.

The present invention is an improvement over an agent for preventing the flooding of color pigments in aqueous, cellulose ether-containing plastic dispersion paints, plastic-based plasters, and distemper paints, the agent being based on a block polymer in which a di- or polyamine is present as the initial molecule on which alkylene oxide units are added.

In the agent according to the invention the block polymer is obtained from one mole of a di- or polyamine of the general Formula

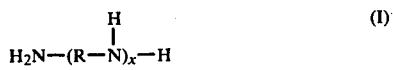

wherein

R is an alkylene group with 2 to 6 carbon atoms, and x is a whole number from 1 to 4, by reaction with about 5 to 50 moles of ethylene oxide, followed by reaction with about 5 to 100 moles of propylene oxide.

Suitable diamines or polyamines according to general Formula I, from which the block polymers used according to the invention may be prepared, are, for example: propylene diamine-1,3, butylene-diamine-1,4, diethylenetriamine, dipropylenetriamine, triethylenetetramine, tetraethylenepentamine, and, preferably, ethylenediamine-1,2. According to the method disclosed in German Offenlegungsschrift No. 2,165,586, first only a relatively small quantity of ethylene oxide is used per mole of the amines of Formula I to saturate the hydrogen atoms attached to the nitrogen. Then, the alcoholic hydroxyl groups present in the thus synthesized molecules are alkalized, for example by the action of sodium methylate, and the resulting product is then reacted with further quantities of ethylene oxide until the desired quantities of ethylene oxide have been incorporated. Finally, propylene oxide is added until the end product has the desired molecular weight.

The block polymers or graft polymers prepared in this manner may correspond, for example, to the following general Formula II:

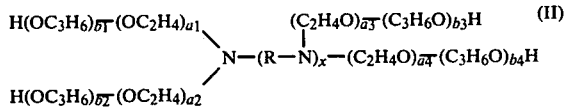

wherein each of the indices $a_1$ to $a_4$ stands for a whole number and the sum $(a_1+a_2+a_3+a_4)=5$ to 50, preferably 10 to 40, and each of the indices $b_1$ to $b_4$ stands for a whole number and the sum $(b_1+b_2+b_3+b_4)=5$ to 100, preferably 40 to 70, while R and x have the meanings stated above.

Aqueous plastic dispersion paints, plastic-based plasters, and distemper paints are normally available in the white state. Their composition may be taken from DIN 18,363 entitled: "Anstricharbeiten" (Painting Jobs) of September 1976: plastic dispersion paints contain plastic dispersions, pigments (normally white pigments, such as titanium dioxide, lithophones, or chalk), fillers (such as calcium carbonates, powdered quartz, barium sulfate, fibrous materials, and granulates), and auxiliaries, e.g. fungicides; they may be either fluid or pasty and are subdivided, according to their composition, into the following groups: washing-resistant, abrasion-resistant, and weather-resistant.

Plastic-based plasters are distinguished from plastic dispersion paints in that they contain fillers which impart a certain structure to them. Distemper paints contain sizes, pigments (normally white pigments), and fillers, e.g. fibrous materials. Plastic dispersions include many of the dispersions of film-forming homo- or copolymers of acrylic acid esters, methacrylic acid esters, acrylic and methacrylic acids, styrene, ethylene, butadiene, acrylonitrile, vinyl acetate, vinyl propionate, vinyl esters of long-chain branched carboxylic acids, or maleic acid esters. Suitable sizes are binders in general, such as water-soluble cellulose ethers, starch, dextrin, vegetable glues, bone glue, and other animal glues. Besides surface-active substances, water-soluble cellulose ethers, such as methyl cellulose, methyl hydroxyalkyl cellulose, carboxymethyl cellulose, hydroxy ethyl cellulose, or mixtures thereof, are added to the paints or plasters in order to improve their water-retention capacity, their processing characteristics, and their adhesion.

The above discussed drawbacks may become apparent when the different disperse systems, viz. white paint or plaster on the one hand and colored pigment component on the other hand, are combined with each other, i.e. when the white paints or plasters are colored.

As a rule, the colored pigment pastes normally used for coloring white paints or plasters contain, in addition to an inorganic or organic pigment, a tenside, an organic solvent, and/or water, and a preservative. Suitable inorganic pigments are, for example, carbon black, zinc sulfides, cadmium sulfides, ultramarine, iron oxides, nickel yellow or chromotitanium yellow, cobalt blue, chromium oxides, or chromates. Among the organic pigments, for example those of the azo, anthraquinone, azaporphine, thioindigo, quinacridone, dioxazine, naphthalene-tetracarboxylic acid, perylene-tetracarboxylic acid, or phthalocyanine series are preferred.

The agent used according to the invention to prevent the "rub-out" of colored pigments may be added to the aqueous paints or plasters containing cellulose ethers and binders, especially to plastic dispersion paints, plastic-based plasters, and distemper paints, either while the paint or plaster is still in the white state, by the manufacturer, converter or consumer, or after the paint or plaster has been colored by the addition of a colored pigment, by the converter or consumer. This latter possibility is of particular importance because in this manner already spoiled compositions, i.e. those displaying flooding when no agent is added to them, may be returned to their useful state. In addition to the preferred possibilities of application mentioned above, it is also possible to add the agent according to the invention directly to the colored pigment paste. Advantageously, about 0.1 to 2.0 percent by weight (calculated on the weight of the colored paint or plaster) of the agent according to the invention are added; in many cases, an addition of about 0.2 to 0.5 percent by weight is sufficient.

The advantages achieved by the agent according to the invention are mainly the following:

The agent according to the invention may be generally added to paints or plasters at all stages of their preparation and is not limited to the use with one class or some classes of color pigments.

The agent according to the invention does not tend to foam, or foams only slightly, so that the frequently occurring foaming during intensive agitation of the paints or plasters is not increased at all or is only insignificantly increased.

The agent according to the invention is capable of becoming effective without the action of strong shear forces, so that mixing it with the paint or plaster at a low rate of revolution of the dissolver or even by hand will be sufficient.

The influence of the agent according to the invention on the water-resistance of the paints or plasters is within tolerable limits.

Some of the terms used above may be taken from DIN 55,945 entitled: "Anstrichstoffe und ähnliche Beschichtungsstoffe" (Paints and Coatings) of October 1973. The term "Ausschwimmen" (flooding), for example, designates the visible separation of the pigments contained in the paint or plaster during storage or while the applied paint dries. A "Bindemittel" (binder) is the nonvolatile component of the paint or plaster, without pigment and filler, but including plasticizers, desiccants, and other nonvolatile auxiliaries, the binder connects the pigment particles with each other and with the base and thus forms the finished coating with them.

DIN 53,778, which is mentioned in the following examples, deals, in part 2 of September 1976, with plastic dispersion paints for indoor use and ways of determining the cleanability of paint coatings and their resistance to washing and abrasion. The washing and abrasion resistance of the dispersion paint coating which is to be determined is its property to exhibit not more than a certain predetermined abrasion when it is subjected to a predetermined period of abrasive stress in a defined abrasion tester.

The color pigment used in all of the following examples is known to present serious flooding problems to the converter or consumer. Therefore, the quantities of the inventive anti-flooding agent which are added in the examples are not representative for the quantities to be used when processing most of the other color pigments or pigment pastes. The quantities added in the examples are very high; in most other cases, lower quantities will be sufficient.

All percentages are by weight.

EXAMPLE 1

A white dispersion paint for indoor use (washing-resistant according to DIN 53,778) of the following composition:
170 p.b.w. of water,
10 p.b.w. of a 10% aqueous solution of Na-polyphosphate,
5 p.b.w. of an $NH_4$ salt of a polyacrylic acid, as the dispersing agent,
1 p.b.w. of a preservative (bactericide),
1 p.b.w. of a 10% aqueous NaOH solution,
75 p.b.w. of titanium dioxide,
400 p.b.w. of crystalline $CaCO_3$,
50 p.b.w. of amorphous $CaCO_3$ (chemically precipitated),
25 p.b.w. of kaolin (aluminum silicate),
1 p.b.w. of an anti-foaming agent,
160 p.b.w. of methyl hydroxyethyl cellulose in a 2.5 percent aqueous solution (medium viscosity of a 2% aqueous solution at 20° C.=6,000 cP),
90 p.b.w. of a styrene-acrylate copolymer dispersion, and
7 p.b.w. of butyl-diglycol acetate, as a film-forming adjuvant, is manually mixed, by means of a spatula, with 2% by weight (based on the weight of the above composition) of a colored pigment paste composed of 25 percent of di-oxazine(carbazole)-violet (Color Index No. 51,319), 13 percent of a tenside, 46.3 percent of ethyleneglycol monoethyl ether, 15 percent of distilled water, and 0.7 percent of sodium-pentachlorophenol as a preservative. The violet pigment contained in the mixture is present in the flocculated, i.e. flooded, state. Two batches of this nonhomogeneous mixture are prepared and from each batch 50 g are removed and mixed, one with 0.5 g (=1% of the weight of the colored dispersion paint) and the other with 0.75 g (=1.5% of the weight of the colored dispersion paint) of a block polymer prepared from the following components: 1 mole of ethylene diamine, about 30 moles of ethylene oxide, and about 60 moles of propylene oxide. The block polymer may be prepared as follows:

A mixture of 14.4 p.b.w. of an 80 percent aqueous ethylene diamine solution and 0.13 p.b.w. of an 80 percent aqueous hydrazine hydrate solution (to improve the color shade) is treated at 70° C. with 42.7 p.b.w. of gaseous ethylene oxide. The resulting intermediate product has an overall nitrogen content of 9.35 percent, the proportion of tertiary nitrogen being 99%. The intermediate product is alkalized by adding 14.4 parts by volume (the relation between parts by volume and parts by weight being the same as between liters and kilograms) of a sodium methylate solution with a sodium content of 12.8 percent. The formation of the alcoholate is completed by 5 hours' drying. 25.7 p.b.w. of the alkalized intermediate product are reacted with 22.7 p.b.w. of ethylene oxide at 120°-130° C.; the addition product of ethylene diamine and ethylene oxide thus produced has an overall nitrogen content of 2.08%, corresponding to a molecular weight of 1345, and the proportion of ethylene oxide added is 29.2 moles. 28.5 p.b.w. of this intermediate product are reacted at 130°-135° C. with 71.5 p.b.w. of propylene oxide. The analysis of the reaction product shows an overall nitrogen content of 0.57%, which corresponds to a molecular weight of 4910 and a proportion of 61.4 moles of propylene oxide.

Samples are taken from the mixtures containing the agent according to the invention and from the mixtures containing no such agent and are applied, by means of a hand-operated wiper, to test cards in a manner such that wet films of about 200 μm thickness result. Before the films are dried, i.e. within 5 minutes, an area of the wet film selected at random is thoroughly spread by rubbing with the tip of the finger. After the films have dried, they are inspected in order to determine if the rubbed and the un-rubbed areas of the film are of identical color or if the color shades are different. The agent added is fully effective if the rubbed and the un-rubbed areas of the films are identical in color. By the addition of 1% of the agent according to the invention, the rub-out of the violet pigment—which is very considerable in the absence of such agent—is reduced to a weak flooding. If 1.5% of the agent according to the invention is added, the color shades are identical, i.e. the violet pigment does not separate.

EXAMPLE 2

In order to investigate the influence of different quantities of the inventive agent on the abrasion resistance of the dispersion paints to which they are added, 0.75%, 1%, 1.5%, and 2% of the agent, based on the weight of the colored dispersion paint, are added to the dispersion paint colored as in Example 1. When the abrasion resistance is tested in accordance with DIN 53,778, about 1200 cycles in an abrasion tester are achieved without the addition of the agent and with an addition of 0.75%, i.e., a quantity which normally will be sufficient in less difficult cases. If 1% of the agent is added, the number of cycles in the abrasion tester drops to about 930, with an addition of 1.5% to about 425 cycles, and at 2% to about 250 cycles.

Comparative Examples V1 to V19

A violet dispersion paint is prepared as described in Example 1 and mixed, once with 1% and then with 1.5% of a known anti-flooding agent. In none of the examples, identical color shades are observed in the different areas of the test films, which means that the known agents, when applied in quantities comparable to the quantities used of the inventive agent, do not prevent the serious flooding of the violet pigment.

TABLE

Comparative Tests

| No. of Test | Chemical Composition of Agent Added | Published in: |
|---|---|---|
| V 1 | block polymer of ethylene diamine, propylene oxide, and ethylene oxide with a proportion of ethylene oxide of 40% | DT-AS No. 2,156,603 |
| V 2 | block polymer of ethylene diamine, propylene oxide, and ethylene oxide with a proportion of ethylene oxide of 40% and a higher molecular weight than in V 1 | DT-AS No. 2,156,603 |
| V 3 | block polymer of ethylene diamine, propylene oxide, and ethylene oxide with a proportion of ethylene oxide of 40% and a higher molecular weight than in V 2 | DT-AS No. 2,156,603 |
| V 4 | block polymer of ethylene diamine, propylene oxide, and ethylene oxide with a proportion of ethylene oxide of 10% | DT-OS No. 2,500,865 |
| V 5 | block polymer of ethylene diamine, propylene oxide, and ethylene oxide with a proportion of ethylene oxide of 20% | DT-OS No. 2,500,865 |
| V 6 | naphthalene sulfonic acid/formaldehyde condensation product | DT-PS No. 2,414,455 |
| V 7 | Na—alkyl-polyglycol ether sulfate with about 2 moles of ethylene oxide | — |
| V 8 | Na—alkyl-polyglycol ether sulfate with about 3 moles of ethylene oxide | — |
| V 9 | nonylphenol-oxethylate with about 8 to 30 moles of ethylene oxide | DT-OS No. 2,500,865 |
| V 10 | cresol-nonylphenol-formaldehyde-oxethylate | — |
| V 11 | tributylphenol-oxethylate with about 50 moles of ethyleneoxide | DT-OS No. 2,500,865 |
| V 12 | oleyl fatty alcohol-oxethylate with about 8 to 25 moles of ethylene oxide | DT-OS No. 2,500,865 |
| V 13 | coconut fatty alcohol-oxethylate with about 8 to 25 moles of ethylene oxide | DT-OS No. 2,500,865 |
| V 14 | stearyl alcohol-oxethylate with about 15 to 25 moles of ethylene oxide | DT-OS No. 2,500,865 |
| V 15 | tallow fatty alcohol-oxethylate with about 11 to 25 moles of ethylene oxide | DT-OS No. 2,500,865 |
| V 16 | iso-tridecanol-oxethylate with about 8 to 15 moles of ethylene oxide | DT-OS No. 2,500,865 |
| V 17 | oleylamino-oxethylate with about 5 to 25 moles of ethylene oxide | DT-PS No. 2,414,455 |
| V 18 | coconut fatty amino-oxethylate with about 2 to 25 moles of ethylene oxide | DT-PS No. 2,414,455 |
| V 19 | Na—lignin-sulfonate | — |

It will be obvious to those skilled in the art that many modifications may be made within the scope of the present invention without departing from the spirit thereof, and the invention includes all such modifications.

What is claimed is:

1. In a process for preventing the flooding of color pigments in aqueous plastic dispersion paints, plastic-based plasters, and distemper paints containing cellulose ethers, in which an agent is added to said paint or plaster, while it is still in the white state or after it has been colored by the addition of said colored pigments, said agent being based on a block polymer in which a di- or polyamine is present as the initial molecule on which alkylene oxide units are added, the improvement comprising adding a block polymer obtained from one mole of a di- or polyamine of the general formula I

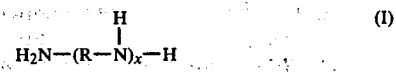

wherein
R is an alkylene group with 2 to 6 carbon atoms, and
x is a whole number from 1 to 4,
by reaction with about 5 to 50 moles of ethylene oxide, followed by reaction with about 5 to 100 moles of propylene oxide.

2. A process according to claim 1 in which 10 to 40 moles of ethylene oxide and 40 to 70 moles of propylene oxide are used for the reaction.

3. A process according to claim 1 in which ethylene diamine is used as the diamine.

4. In an aqueous composition selected from the group consisting of (a) plastic dispersion paint and plastic-based plaster containing plastic dispersion, white pigments, fillers and auxiliaries, and (b) distemper paint containing sizes, white pigments and fillers, which is either colored or is to be colored and which is white as long as no color pigment is added, said composition containing an agent for preventing the flooding of color pigments therein and being based on a block polymer in which a di- or polyamine is present as the initial molecule on which alkylene oxide units are added, the improvement comprising employing a block polymer obtained from one mole of a di- or polyamine of the general formula I

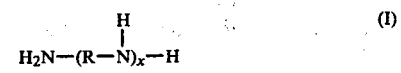

wherein
R is an alkylene group with 2 to 6 carbon atoms, and
x is a whole number from 1 to 4,
by reaction with about 5 to 50 moles of ethylene oxide, followed by reaction with about 5 to 100 moles of propylene oxide, said composition containing about 0.1 to 2.0 percent by weight of said block polymer, calculated on the weight of said composition in the colored state.

* * * * *